United States Patent [19]

Autzen et al.

[11] Patent Number: 4,464,352

[45] Date of Patent: Aug. 7, 1984

[54] MANUFACTURE OF ACICULAR FERRIMAGNETIC IRON OXIDE

[75] Inventors: Horst Autzen, Freinsheim; Herbert Motz, Beindersheim; Peter Rudolf, Neuhofen; Wilhelm Sarnecki, Limburgerhof; Werner Steck, Mutterstadt; Guenter Vaeth, Limburgerhof, all of Fed. Rep. of Germany

[73] Assignee: BASF Aktiengesellschaft, Fed. Rep. of Germany

[21] Appl. No.: 448,489

[22] Filed: Dec. 10, 1982

Related U.S. Application Data

[63] Continuation of Ser. No. 006,530, Jan. 25, 1979.

[30] Foreign Application Priority Data

Feb. 9, 1978 [DE] Fed. Rep. of Germany ....... 2805405

[51] Int. Cl.$^3$ .............................................. C01G 49/06
[52] U.S. Cl. .................................. 423/634; 252/62.56
[58] Field of Search ..................... 252/62.56; 423/632, 423/634

[56] References Cited

U.S. PATENT DOCUMENTS

| | | | |
|---|---|---|---|
| 2,900,236 | 8/1959 | Speed et al. | 423/634 |
| 3,498,748 | 3/1970 | Greiner | 252/62.56 X |
| 3,897,354 | 7/1975 | Woditsch et al. | 252/62.56 X |
| 3,904,540 | 9/1975 | Bennetch et al. | 423/634 X |
| 4,108,787 | 8/1978 | Masaki et al. | 252/62.56 |

FOREIGN PATENT DOCUMENTS

| | | | |
|---|---|---|---|
| 39-20939 | 9/1964 | Japan | 423/634 |
| 675260 | 7/1952 | United Kingdom . | |

OTHER PUBLICATIONS

Hamada et al., "Bull. of the Chem. Soc. of Japan", vol. 50, (6), pp. 1635–1636, (1977).

*Primary Examiner*—Jack Cooper
*Attorney, Agent, or Firm*—Keil & Weinkauf

[57] ABSTRACT

A process for the manufacture of acicular ferrimagnetic iron oxide by converting acicular iron(III) oxide hydroxide at from 300° to 650° C., by treatment with an organic compound which decomposes in this temperature range in the presence of iron oxide, the iron(III) oxide hydroxide used for the reaction being a lepidocrocite which has been heat-treated at from 300° to 700° C.

1 Claim, No Drawings

MANUFACTURE OF ACICULAR FERRIMAGNETIC IRON OXIDE

This is a continuation of application Ser. No. 6,530 filed Jan. 25, 1979.

The present invention relates to a process for the manufacture of acicular ferrimagnetic iron oxide by reduction of acicular iron(III) oxide hydroxide at from 300° to 650° C. by means of an organic compound which decomposes in this temperature range in the presence of iron oxide, with or without subsequent oxidation of the resulting product with an oxygen-containing gas at from 150° to 500° C.

Acicular ferrimagnetic iron oxides, eg. magnetite and gamma-iron(III) oxide, have long been used extensively as magnetizable materials in the manufacture of magnetic recording media. A large number of processes for the manufacture of gamma-iron(III) oxide, which is the principally used oxide, has been disclosed. For example, British Pat. No. 675,260 describes a process for obtaining gamma-iron(III) oxide in which acicular alpha-iron oxide hydroxide (goethite) is dehydrated to alpha-iron(III) oxide, the latter is converted to magnetite in a reducing atmosphere at above 300° C., and the magnetite is oxidized to acicular gamma-iron(III) oxide in air at below 450° C. In the course of attempts to improve the crystalline, mechanical and magnetic properties of such materials, the individual stages of this process have frequently been varied, as have the starting materials.

Virtually simultaneously with the research leading to the process according to the above British patent, suitable magnetic iron oxides were obtained by the method disclosed in German Pat. No. 801,352, namely by treating a non-magnetic iron oxide with a salt of a short-chain carboxylic acid and then heating the oxide. The magnetite thus obtained can also be converted to gamma-iron(III) oxide by oxidation at 200°–400° C. Subsequently, U.S. Pat. No. 2,900,236 disclosed that all organic compounds which can be decomposed below 540° C., with little formation of tar and ash, are suitable for reducing non-magnetic iron oxides to magnetite. For this purpose, the iron oxide is brought into contact with the gaseous, solid or liquid organic substance and is heated at from 540° to 650° C. Whilst U.S. Pat. No. 2,900,236 states that all organic substances meeting the above requirements may be used for the purpose and specifically mentions wax, starch and oil, German Published Application DAS No. 1,203,656 mentions salts of soluble soaps, precipitated onto the iron oxides, as reducing agents for obtaining magnetite from non-magnetic iron oxides, German Laid-Open Application DOS No. 2,064,804 mentions higher hydrocarbons, higher alcohols and amines, higher fatty acids and their salts, as well oils, fats and waxes, East German Pat. No. 91,017 also mentions long-chain carboxylic acids and their salts, German Published Application DAS No. 1,771,327 mentions aliphatic monocarboxylic acids of 8 to 25 carbon atoms, which may or may not be mixed with morpholine, and Japanese Laid-Open Application No. 80,449/1975 mentions organic compounds, eg. inert gases containing ethanol, for the same purpose. In the above prior art processes, the material is in some cases heated in the absence of air, whereupon the reaction stops at the magnetite stage, and in some cases in the presence of air, whereby the magnetite is directly oxidized to gamma-iron(III) oxide.

Starting materials employed for this conversion of iron oxides by means of organic substances have in the main been the corresponding alpha-modifications, such as alpha-FeOOH or alpha-$Fe_2O_3$, but $\delta$-FeOOH (German Published Application DAS No. 1,203,656) and gamma-FeOOH (German Laid-Open Application DOS No. 2,212,435) have also beem employed successfully. If gamma-FeOOH is dehydrated to alpha-$Fe_2O_3$ at an elevated temperature, the product then reduced with hydrogen to $Fe_3O_4$ and the latter reoxidized with air to gamma-$Fe_2O_3$, a decrease in the coercive force of the resulting gamma-$Fe_2O_3$ with increasing dehydration temperature or reduction temperature is observed (Bull. Chem. Soc. Jpn., 50 (6), (1977), 1635).

The above diverse efforts to improve the magnetic iron oxides suitable for the manufacture of magnetic recording media clearly reflect the desire not only to meet, in this way, the rising technical standards to which recording media have to conform, but also to compensate for the disadvantages of other magnetic materials which can be employed.

It is an object of the present invention to improve the conventional acicular ferrimagnetic iron oxides and free them from their disadvantages. In particular, it is an object of the invention to provide an acicular gamma-iron(III) oxide which is distinguished by high coercive force and residual induction and by mechanical and magnetic stability.

We have found that this object is achieved and that acicular ferrimagnetic iron oxide having the above required properties can be obtained by conversion of acicular iron(III) oxide hydroxide at from 300° to 650° C. by treatment with an organic compound which decomposes on this temperature range in the presence of iron oxide, if the acicular iron(III) oxide hydroxide employed is a lepidocrocite which has been heat-treated at from 300° to 700° C. Heat-treatment in this context means a treatment which as a rule involves dehydration.

It is particularly advantageous if, in the process according to the invention, the lepidocrocite has a length/width ratio of at least 10:1 and if the heat-treatment is carried out at from 350° to 700° C. and especially at from 400° to 700° C.

The lepidocrocite employed for the process according to the invention can be prepared under suitable reaction conditions from iron(II) salt solutions and alkalis, with simultaneous oxidation, for example as described in German Published Application DAS No. 1,061,760. However, it has proved particularly advantageous to form small iron(III) oxide hydroxide nuclei, up to an amount of from 25 to 60 mole percent of the iron employed, from an aqueous iron(II) chloride solution by means of an alkali, eg. an alkali metal hydroxide or ammonia, at from 10° to 36° C. whilst stirring vigorously to produce fine air bubbles; the end product is then formed by growth of the nuclei at from 20° to 70° C. and a pH of from 4.0 to 5.8 (obtained by adding further quantities of alkali) with vigorous dispersion of air in the mixture. After completion of growth, the solids content of iron(III) oxide hydroxide in the aqueous suspension should be from 10 to 70 g/l, preferably from 15 to 65 g/l. After filtering off and washing the precipitate, the iron(III) oxide hydroxide obtained is dried at from 60° to 200° C.

Using the above procedure, given by way of an example, stable acicular lepidocrocite crystals can be obtained which exhibit virtually no dendritic branching.

A further characteristic of the acicular lepidocrocite suitable for use in the process according to the invention is a mean particle length of from 0.2 to 1.5 μm. The length/width ratio is at least 10:1, ratios of from 12 to 40:1 being advantageous. The particle surface area, measured by the BET method, is from 18 to 70 m²/g.

If a lepidocrocite having these characteristics is heat-treated at from 300° to 700° C. before being processed further by conventional methods to give a ferrimagnetic iron oxide, it is found that, surprisingly, the coercive strength and residual induction of the end products obtained are improved. The heat-treatment may be carried out either in air or in an inert gas atmosphere.

The product obtained after the heat treatment step is converted to acicular ferrimagnetic iron oxide by conventional treatment with an organic substance which decomposes in the presence of iron oxide at from 300° to 650° C.

For this purpose, the heat-treated lepidocrocite is mixed mechanically with the solid or liquid organic substance or is coated with the substance in a suitable solution or suspension thereof, and is then heated at from 300° to 650° C. under an inert gas. Examples of compounds which may be used advantageously for this purpose are higher fatty acids and their salts, their derivatives, waxes and paraffins.

The process can be carried out similarly using a gaseous organic substance which is metered into the inert gas, for instance inert gas/alcohol vapor mixtures.

Depending on the organic substance used and on the appropriate reaction temperature chosen, the conversion of the heat-treated lepidocrocite to acicular magnetite is complete in from about 1 to 120 minutes. Organic substances which can be employed for the purposes of the process according to the invention are all compounds stated to be suitable in the prior art, provided they can be decomposed in the presence of iron oxide at from 300° to 650° C. In this context, iron oxide means the pigment obtained by heat treatment of gamma-FeOOH at from 300° to 700° C.

The acicular magnetite obtained by this reduction reaction is usually oxidized to gamma-iron(III) oxide, advantageously by passing air over the magnetite or by exposing it to oxygen, at from 150° to 500° C.

If, however, the above conversion reaction is not carried out under an inert gas but in the presence of oxygen, for example in the form of air, it is possible to obtain gamma-iron(III) oxide directly if the treatment is carried out at below about 500° C.

The acicular ferrimagnetic iron oxides prepared according to the invention, in particular gamma-iron(III) oxide, show unexpectedly advantageous properties when used as magnetic pigments for the production of magnetic recording media. To produce the magnetic coatings, the gamma-iron(III) oxide is dispersed in a polymeric binder. Suitable binders for this purpose are conventional compounds, for example homopolymers and copolymers of vinyl monomers, polyurethanes, polyesters and the like. The binder is used as a solution in a suitable organic solvent, which may or may not contain other additives. The magnetic coatings are applied to rigid or flexible bases, eg. disks, films and cards.

The acicular ferrimagnetic iron oxides produced in accordance with the invention, in particular the gamma-iron(III) oxide thus obtainable, differ distinctly from the conventional gamma-iron(III) oxides in respect of their more uniform acicular shape (since agglomeration by sintering is avoided), improved orientability, and higher coercive force and residual induction which, surprisingly, can be achieved by the process according to the invention. These improvements in the magnetic material also manifest themselves clearly in the magnetic tapes produced with the material.

The Examples which follow illustrate the invention.

The magnetic properties are measured on an oxide sample having a tap density of $D = 1.2$ g/cm³, using a conventional vibrating sample magnetometer at a field strength of 100 kiloamps/m. The coercive force ($H_c$) is given in [kiloamps/m], whilst the specific remanence ($M_r/\rho$) and the specific magnetization ($M_m/\rho$) are given in [nT.m³/g].

EXAMPLE 1

Preparation of gamma-FeOOH 2.18 moles of $Fe^{2+}$ (in the form of a technical-grade $FeCl_2$ solution) are diluted with water to give 2.7 liters of solution, and the latter is introduced into a 6 liter glass vessel equipped with a stirrer, air supply tube, dropping funnel and reflux condenser.

2.18 moles of NaOH dissolved in $H_2O$ are introduced at 28° C. by means of a hose pump; this produces 50% precipitation. After completion of this precipitation, 400 liters of air per hour are passed into the suspension with vigorous stirring. The nucleation phase is complete when the pH of the suspension has fallen to 3.3. The temperature is then raised to 40° C. and 600 liters of air per hour are introduced. 2.18 moles + a 10% excess of NaOH are dissolved in 2 liters of $H_2O$ and introduced into the suspension at pH 5.5, via an automatic pH regulator. The reaction is complete when no further sodium hydroxide solution is required to maintain the pH at 5.5. The final concentration of gamma-FeOOH is then 32.3 g per liter of suspension. The pigment is filtered off, washed chloride-free with $H_2O$ and dried at 130° C. in a through-circulation dryer. The yield is about 180 g of gamma-FeOOH and the specific surface area is about 29.0 m²/g.

150 g of gamma-FeOOH (Sample 1) are dehydrated for 30 minutes at 550° C. in the presence of air and then mixed with 2.5 percent by weight of stearic acid. This mixture is kept at 100° C. in air for 1 hour. A Comparative Sample 1 is treated in the same way, but without the prior heat treatment.

Both samples are reduced in the same way to $Fe_3O_4$ under nitrogen at 520° C. and oxidized with air at 280° C.

|  | Hc | $M_m/\rho$ | $M_r/\rho$ |
|---|---|---|---|
| Example 1 | 27.5 | 76 | 40 |
| Comparative Example 1 | 22.5 | 71 | 39 |

To prepare the two magnetic dispersions, tube mills are charged with 8,000 parts of steel balls of 5 mm diameter and thereafter 700 parts of the particular magnetic material, 420 parts of a mixture of equal parts of tetrahydrofuran and dioxane, 8.75 parts of lecithin, 8.75 parts of a neutral polyaminoamide salt and 210 parts of a 20% strength solution of a copolymer of 80% of vinyl chloride, 10% of dimethyl maleate and 10% of diethyl maleate in a mixture of equal parts of tetrahydrofuran and dioxane are introduced. The mixture is dispersed for 40 hours. 1,090 parts of a 10% strength solution of a thermoplastic polyester-urethane, produced from adipic acid, 1,4-butanediol and 4,4'-diisocyanatodiphenylmethane, in a mixture of equal parts of tetrahydrofuran and dioxane are then added, as well as 0.7 part of polydimethylsiloxane. After dispersing for a further 5 hours, the magnetic dispersion obtained is filtered under pressure through a filter of 5 μm pore size. A 6 μm thick polyethylene terephthalate film is then coated with the magnetic dispersion in the conventional manner by means of a knife coater, and after passing through a magnetic field, the coating is dried at from 60° to 100° C. After drying, the thickness of the magnetic coating on the film is 5 μm. The coating is calendered by passing the coated film between heated rollers at 80° C. under a nip pressure of 3 kg/cm. The coated film is cut into tapes 6.25 mm wide. The electroacoustic measurements are carried out as described in DIN 45,512, Part II. Table 2 shows the results of the measurements.

| Magnetic properties of tape | Sample 1 | Comparative Sample 1 |
|---|---|---|
| $H_c$ [kiloamps/m] | 27.1 | 22.3 |
| $M_r$ [mT] | 143 | 130 |
| $M_r/M_m$ | 0.82 | 0.78 |
| Orientation ratio ($M_r$ lengthwise/$M_r$ crosswise) | 2.4 | 2.2 |
| $E_T$ db | −0.2 | −0.9 |
| $E_H$ db | −0.1 | −1.8 |
| $A_T$ db | −1.2 | −2.2 |
| $A_H$ db | ±0 | −2.4 |

$E_T$ = sensitivity at long wavelengths;
$E_H$ = sensitivity at short wavelengths;
$A_T$ = maximum output level at long wavelength;
$A_H$ = maximum output level at short wavelengths.

EXAMPLE 2

20 moles of $FeCl_2$ are dissolved in water to give 27 liters of solution, in a 100 liter reaction vessel, and the temperature is brought to 22° C. whilst at the same time passing 400 liters/h of nitrogen through the reactor. 20.6 moles of NaOH dissolved in 13.3 liters of water are then added in the course of 20 minutes, whilst stirring at 120 rpm. Thereafter, 1100 liters of air per hour are introduced, instead of the nitrogen stream, until the pH has fallen to about 3.1. An orange suspension of nuclei is obtained by this method after 4.8 hours.

This suspension is heated to 41° C. whilst continuing to stir at 120 rpm and to pass 1100 liters of air per hour through the reactor. When this temperature is reached, the pH is kept at 5.3, by running in additional aqueous sodium hydroxide solution, until the reaction is complete. The growth of the nuclei takes 2.0 hours.

The suspension is filtered on a suction filter and the filter residue is washed with water until the filtrate is chloride-free, and is then dried in an oven at 130° C.

The resulting iron oxide hydroxide consists entirely of gamma-FeOOH and has a specific surface area of 26 $m^2/g$.

The heat treatment of this lepidocrocite is carried out in air for one hour at 520° C. The resulting product is divided into 8 equal batches which are each mixed with 2.5% of the organic reducing agents shown in Table 3. The batches are reduced to magnetite under nitrogen, and oxidized to gamma-$Fe_2O_3$ in air, under the conditions shown in Table 3. The magnetic properties are also listed in Table 3.

COMPARATIVE EXAMPLE 2

The procedure described in Example 2 is followed, but the lepidocrocite is not heat-treated before the reduction and oxidation. The reaction conditions and results of the measurements are also shown in Table 3.

TABLE 3

| Example 2 | Reducing agent | Reducing conditions [°C.] [Min.] | Oxidizing conditions [°C.] [Min.] | $H_c$ | $M_m/\rho$ | $M_r/\rho$ |
|---|---|---|---|---|---|---|
| Sample A | Paraffin | 520°/30' | 280°/30' | 27.2 | 78 | 45 |
| Sample B | Na stearate | 555°/30' | 280°/30' | 27.0 | 78 | 45 |
| Sample C | Zn stearate | 550°/30' | 370°/30' | 27.1 | 80 | 46 |
| Sample D | Stearic acid | 520°/30' | 370°/30' | 27.2 | 78 | 45 |
| Comparative Example 2 (not heat-treated) | | | | | | |
| Sample A | Paraffin | 520°/30' | 280°/30' | 22.3 | 69 | 38 |
| Sample B | Na stearate | 555°/30' | 280°/30' | 19.7 | 67 | 37 |
| Sample C | Zn stearate | 550°/30' | 370°/30' | 20.2 | 72 | 40 |
| Sample D | Stearic acid | 520°/30' | 370°/30' | 22.2 | 72 | 39 |

EXAMPLE 3

The procedure described in Example 2 is followed, except that the organic substances or mixtures shown below are used for the reduction.

TABLE 4

| Example 3 | Reducing agent | Reducing conditions [°C.] [Min.] | Oxidizing conditions [°C.] [Min.] | $H_c$ | $M_m/\rho$ | $M_r/\rho$ |
|---|---|---|---|---|---|---|
| Sample E | Stearic acid + paraffin | 550° C./30' | 370°/30' | 26.2 | 79 | 45 |
| Sample F | Stearic acid | 520° C./30' | 460°/30' | 27.4 | 74 | 44 |
| Sample G | Sodium stearate + zinc stearate | 520° C./30' | 370°/30' | 26.8 | 81 | 46 |
| Sample H | Stearic acid | 480° C./30' | 280°/30' | 26.7 | 72 | 42 |

EXAMPLE 4

Using the procedure described in Example 2, iron-(III) oxide hydroxide consisting entirely of lepidocrocite and having a specific surface area of 27.6 $m^2/g$, measured by the BET method, was produced in a 50 $m^3$ kettle, the yield of gamma-FeOOH being 945 kg. The temperature was 22°–23° C. in the nucleation stage and 32°–34° C. in the growth stage, the pH being 5.0. Both in the nucleation stage and in the growth stage a stream of air of 2,000 m³/h was used.

This leipdocrocite was heat-treated at the temperatures shown in Table 5, in each case for 30 minutes, mixed with 2.5% of stearic acid and converted to gamma-Fe₂O₃ as described in Example 2. The reaction conditions and magnetic properties are also shown in Table 5.

COMPARATIVE EXAMPLE 3

The procedure followed is as described in Example 4, but without heat treatment of the lepidocrocite. The results are given in Table 5.

TABLE 5

| Example 4 | Heat treatment temperature | Reducing conditions [°C.] [Min.] | Oxidizing conditions [°C.] [Min.] | $H_c$ | $M_m/\rho$ | $M_r/\rho$ |
|---|---|---|---|---|---|---|
| Sample A | 450°/30' | 520°/30' | 280°/30' | 25.3 | 75 | 42 |
| Sample B | 470°/30' | 480°/30' | 280°/30' | 24.5 | 76 | 42 |
| Sample C | 400°/30' | 540°/30' | 280°/30' | 24.5 | 75 | 42 |
| Comparative Example 3 | — | 480°/30' | 280°/30' | 21.1 | 70 | 38 |

EXAMPLE 5 AND COMPARATIVE EXAMPLE 4

Using the procedure described in Example 1, the two gamma-Fe₂O₃ samples from Example 4 B and Comparative Example 3 are converted to magnetic dispersions which are used to produce magnetic tapes.

The electro-acoustic measurements are carried out as described in DIN 45,512, Part II.

Table 6 shows the results of the measurements.

| Magnetic properties of tape | Comparative Example 4 (non-heattreated product from Comparative Example 3) | Example 5 (heat-treated product from Example 4 B) |
|---|---|---|
| $H_c$ [kiloamps/m] | 21.8 | 25.0 |
| Mr [mT] | .125 | 143 |
| Orientation ratio ($M_r$ lengthwise/$M_r$ crosswise) | 1.8 | 3.0 |
| $E_T$ [db] | −1.0 | −0.2 |
| $E_H$ [db] | −3.3 | −0.4 |
| $A_T$ [db] | −2.8 | −1.0 |
| $A_H$ [db] | −3.8 | −1.0 |

EXAMPLE 6

A gamma-FeOOH, prepared as described in Example 1 and having a specific surface area of 40.7 m²/g was heat-treated for 30 minutes at 500° C. in the presence of air, mixed with 2.5 percent by weight of stearic acid and reduced under nitrogen at 500° C. to Fe₃O₄, which was then oxidized with air at 350° C. to gamma-Fe₂O₃. A Comparative Sample was converted in the same way, except that no prior heat treatment was effected. The results of the magnetic measurements are shown in Table 7.

TABLE 7

| Example | $H_c$ | $M_m/\rho$ | $M_r/\rho$ |
|---|---|---|---|
| Example 6 | 27.3 | 77 | 41 |
| Comparative Sample | 21.2 | 75 | 38 |

EXAMPLE 7

Two gamma-FeOOH samples (7A and 7B) from Example 4 are heat-treated for 30 minutes in air at 520° C. and then mixed with 3 percent by weight of the reducing agents shown in Table 8. The reduction to Fe₃O₄ under N₂ is carried out at 520° C., and the oxidation to gamma-Fe₂O₃ is carried out with air at 280° C. The Comparative Samples A and B are converted to gamma-Fe₂O₃ in the same way, except that no prior heat treatment is effected. The results of the magnetic measurements are shown in Table 8.

TABLE 8

| Example | Reducing agent | $H_c$ | $M_m/\rho$ | $M_r/\rho$ |
|---|---|---|---|---|
| Sample 7A | Zinc stearate | 26.4 | 77 | 43 |
| Comparative Sample A | Zinc stearate | 21.1 | 70 | 36 |
| Sample 7B | Soybean lecithin | 26.0 | 72 | 41 |
| Comparative Sample B | Soybean lecithin | 22.4 | 70 | 37 |

We claim:
1. A process for the manufacture of acicular ferrimagnetic iron oxide, which comprises:
(a) dehydrating needle-shaped synthetic lepidocrocite particles having a mean particle length of from 0.2 to 1.5 μm, a length to width ratio of at least 10:1 and a particle surface area of from 18 to 70 m²g, which lepidocrocite exhibits substantially no dendritic branching by heating in air or in an inert gas atmosphere and at a temperature in the range of 300° to 700° C.;
(b) reducing the resulting particles to acicular magnetite particles by heating the same at a temperature in the range of 300° to 650° C., under an inert gas, and in contact with an organic compound which decomposes at the reducing temperature; and
(c) oxidizing the resulting magnetite particles at a temperature in the range of 150° to 500° C. and in the presence of air to convert said magnetite particles into acicular ferrimagnetic gamma-ferric oxide particles.

* * * * *